Figure 1:
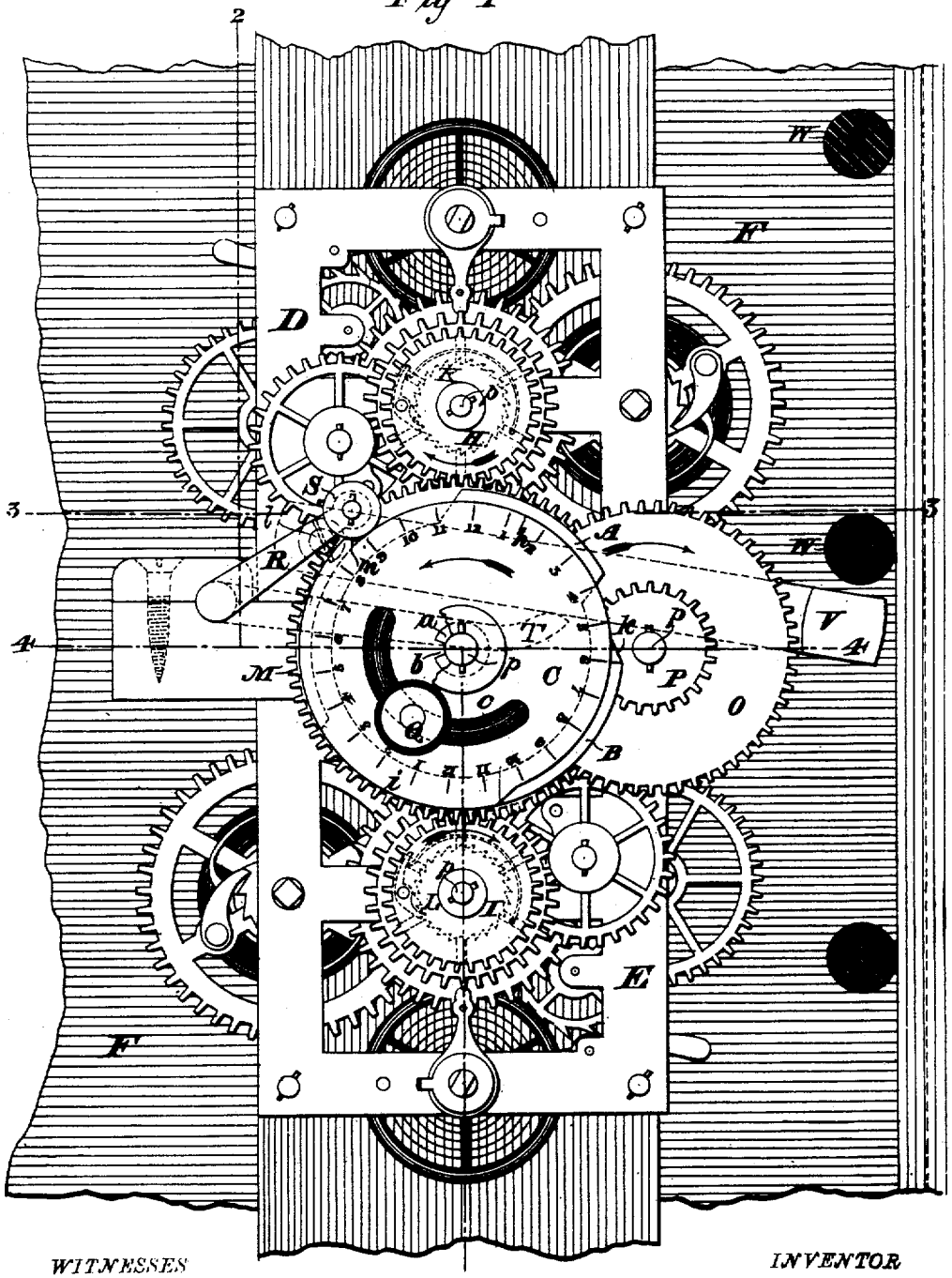

70. LOCKS,

273

BEST AVAILABLE COPY

4 Sheets—Sheet 1.

S. A. LITTLE.

Assignor to THE YALE LOCK MANUFACTURING COMPANY,

Time-Lock.

No. 8,035. Reissued Jan. 8, 1878.

WITNESSES

Wm A. Stinkle.

Geo W Breck

INVENTOR

Samuel A. Little.

By his Attorneys.

Baldwin, Hopkins & Peyton.

H. PETERS, PHOTO-LITHOGRAPHER, WASHINGTON, D. C.

70. LOCKS,

273

4 Sheets—Sheet 2.

S. A. LITTLE.

Assignor to THE YALE LOCK MANUFACTURING COMPANY,

Time-Lock.

No. 8,035. Reissued Jan. 8, 1878.

WITNESSES

Wm A Skinkle

Geo W Breck

INVENTOR

Samuel A. Little

By his Attorneys

Baldwin, Hopkins & Peyton

N. PETERS, PHOTO-LITHOGRAPHER, WASHINGTON, D. C.

70. LOCKS,

273

4 Sheets—Sheet 3.

S. A. LITTLE.

Assignor to THE YALE LOCK MANUFACTURING COMPANY.

Time-Lock.

No. 8,035. Reissued Jan. 8, 1878.

WITNESSES

Wm. A. Stinkle

Geo W Beck

INVENTOR

Samuel. A. Little.

By his Attorneys,

Baldwin, Hopkins & Peyton

N. PETERS, PHOTO-LITHOGRAPHER, WASHINGTON, D. C.

70. LOCKS,
273

4 Sheets—Sheet 4.

S. A. LITTLE.

Assignor to THE YALE LOCK MANUFACTURING COMPANY,

Time-Lock.

No. 8,035. Reissued Jan. 8, 1878.

WITNESSES

Wm A Skinkle

Geo W Breck

INVENTOR

Samuel A. Little.

By his Attorneys.

B Sherman Hopkins & Peyton

N. PETERS, PHOTO-LITHOGRAPHER, WASHINGTON, D. C.

UNITED STATES PATENT OFFICE.

SAMUEL A. LITTLE, OF SHELBURNE, MASSACHUSETTS, ASSIGNOR TO THE YALE LOCK MANUFACTURING COMPANY, OF STAMFORD, CONN.

IMPROVEMENT IN TIME-LOCKS.

Specification forming part of Letters Patent No. 146,832, dated January 27, 1874; Reissue No. 7,104, dated May 9, 1876; Reissue No. 8,035, dated January 8, 1878; application filed December 15, 1877.

*To all whom it may concern:*

Be it known that I, SAMUEL A. LITTLE, of Shelburne, in the county of Franklin and State of Massachusetts, have invented certain new and useful Improvements in Chronometric Locks; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The object of my invention is to construct a time-lock, and to combine it with the multiple sliding bolt-work of a safe or vault door, so that, by the continuous movement of its time mechanism, locking and unlocking will be effected daily or periodically; and to provide said lock with adjustable devices for regulating and controlling the hours of both locking and unlocking; and to combine with said daily unlocking devices a device for preventing the unlocking of the lock every seventh day, or whenever desired, for a period greater than twenty-four hours.

I provide two time-movements, which revolve a graduated dial, so constructed and arranged that its motion oscillates, at certain regular determinable intervals, a pivoted bent lever, which, in turn, in one instance, for automatic locking, lifts the free part of and thus oscillates on its stationary pivot a metallic dog or obstruction, so as to cause it to rest in the way and prevent the retraction of the sliding bolt-work, and in the other instance, for automatic unlocking, it merely withdraws its support from under and permits the dog to oscillate by gravity, so as to clear the way and leave an open space for the retraction of the sliding bolt-work.

The gist of my invention, therefore, is the combination, in a time-lock, of time mechanism revolving a graduated dial, which serves to oscillate a pivoted bent lever, that, in turn, induces the oscillation of a pivoted dog or obstruction to the retraction of the multiple sliding bolt-work.

Subordinate to this main principle or chief organization of my time-lock, I provide that my dial shall be composite in its construction, whereby I obtain what I term a "differential cam" for convenience of adjustment, so that various conditions may be met and the best results in practical operation attained, as will presently appear more particularly.

I further provide a supplemental adjustable cam-wheel, parallel with and adjoining my dial, which may regularly on Sundays, or at will on holidays, or whenever desirable, temporarily assume one of the functions of my dial, and suspend or prevent its unlocking action, as will also presently appear more particularly.

Figure 2:
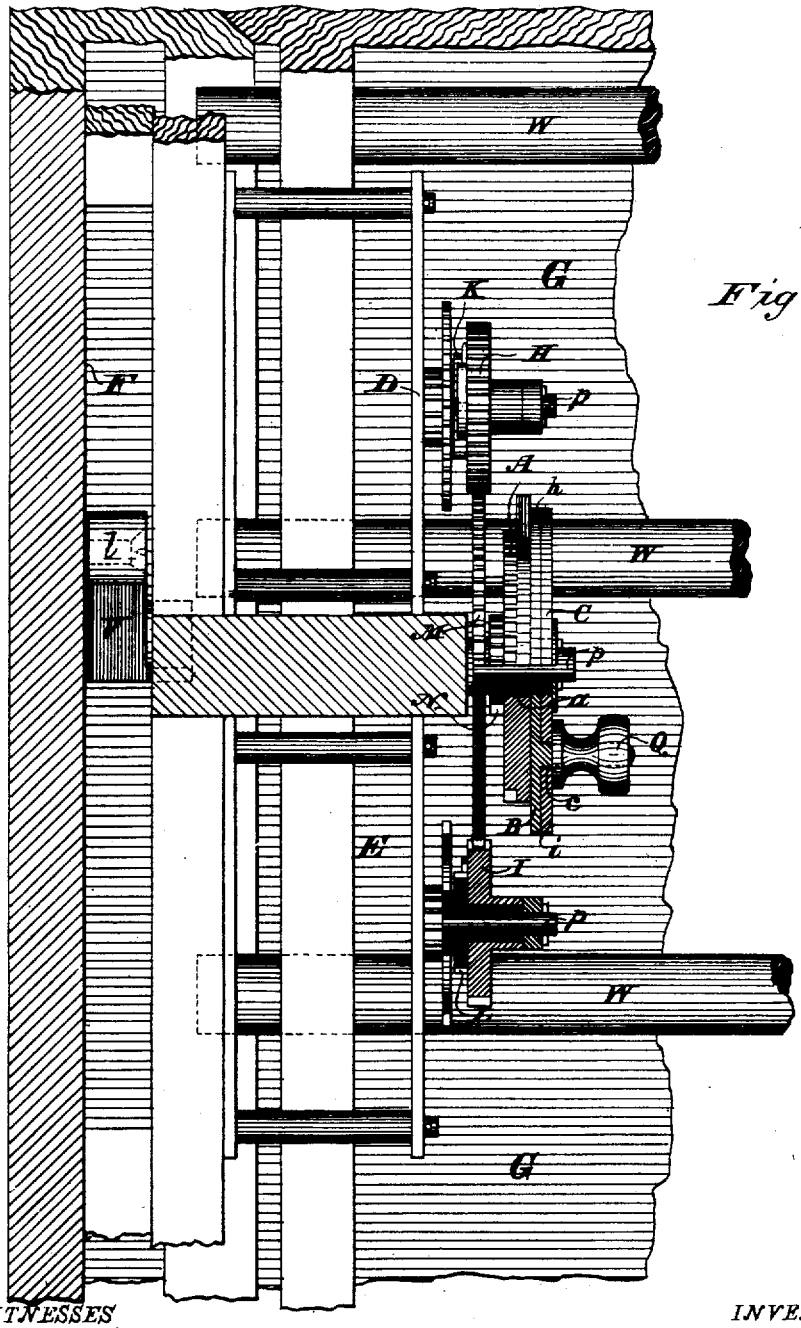
Figure 3:
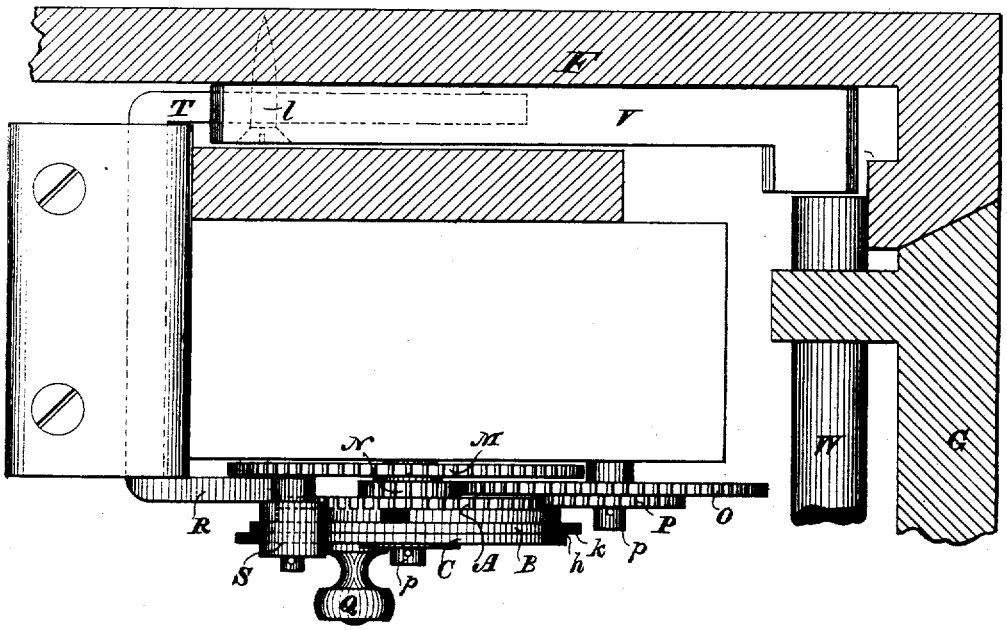
Figure 4:
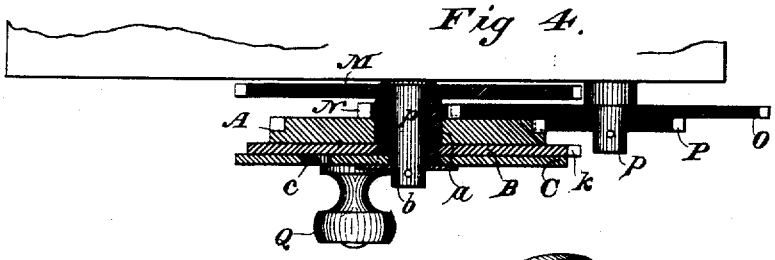
Figure 8:
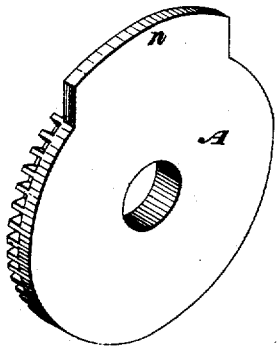
Figure 5:
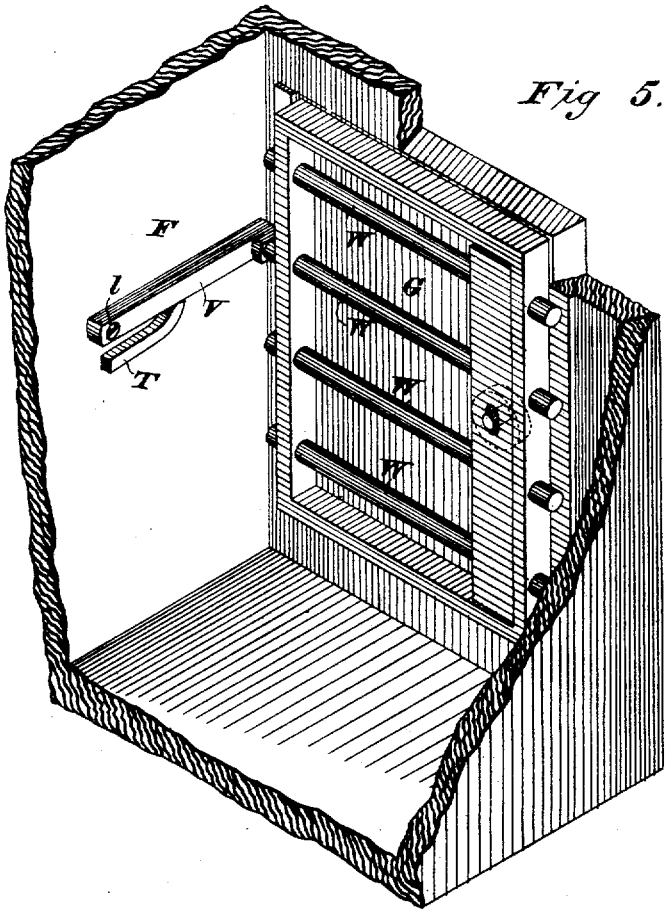
Figure 7:
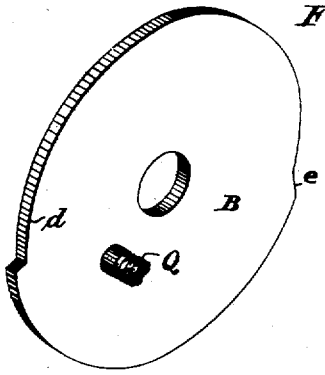
Figure 6:
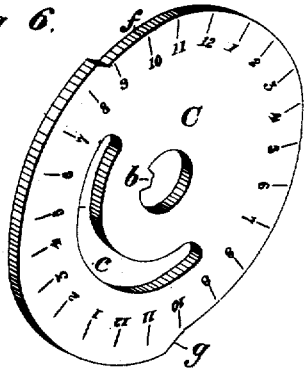

Referring now to the drawings in aid of a description of my lock in detail, Figure 1 is a front view of my improved time-lock attached to the inside of a safe, adjacent to the hinge part of the safe-door; Fig. 2, a view of the same, partly in elevation and partly in section, on the line 2 2 of Fig. 1; Fig. 3, a horizontal transverse section thereof on the line 3 3 of Fig. 1, with the upper time-movements removed, showing a plan of the locking mechanism proper; Fig. 4, a horizontal transverse section through the center of the locking-dials; Fig. 5, a perspective view of the interior of a safe, showing the door-bolts locked forward by the lever-dog; Fig. 6, a perspective view of the graduated dial, marked C in Fig. 1; Fig. 7, a similar view of wheel B in Fig. 1; Fig. 8, a similar view of a seventh-day wheel, marked A in Fig. 1.

D and E designate two time-movements, fastened to the inside F of a safe, adjacent to the hinged part of the safe-door G. These time-movements, through the wheels and ratchets K and L, propel the wheels H and I in the direction of the arrows thereon. These wheels H and I rotate once in twelve hours, and are both geared to the common wheel M, which has twice as many teeth as either of them, and they propel it in the direction of the arrow thereon, so that, while wheels H and I are rotated once in twelve hours, wheel M is rotated only once a day. It will be seen that both time-movements work together in turning the wheel M, and thereby operate the lock; but if either accidentally stops, the wheel H or I of the other will alone continue to rotate the wheel M and operate the lock, because each ratchet will allow free motion to either wheel I or H in the absence of its normal impelling force. The toothed wheel N, forming part of the wheel M, is geared into and drives the toothed wheel O. The toothed wheel P, forming part of the wheel O, is geared into and drives the seventh-day wheel A, which turns loosely on the hub *a* of the wheel M. This wheel A has twice as many teeth as wheel P, and wheel O has three and a half times as many teeth as wheel N. Therefore, while wheel M revolves once in a day, it only causes wheel A to revolve once in seven days. The wheel C, which is graduated for the hours of the day, is fastened rigidly upon the hub *a* by means of the projection *b*, and rotates with it. Loose on the same hub is the wheel B, which may be fastened by friction to wheel C in different positions by the thumb-screw Q, that is attached to or forms part of the wheel B, and passes through the slot *c* of the wheel C.

*p p p p p* designate pivots on which the several wheels revolve. The wheel B is cut away on its periphery, leaving the depression *d* and the cam-projection *e*, and the periphery of wheel C is similarly cut away, leaving the depression *f* and the cam-projection *g* of the same form and size as the depression and projection of the wheel B. When these two wheels are fastened together by the thumb-screw Q, side by side, they form one wheel or dial, having a depression, *h*, which may be enlarged or diminished by rotating the wheel B by means of the thumb-screw, and then setting it, and also having a cam or projection, *i*, which may be enlarged or diminished in the same manner. Pivoted near its middle to the lock-case is the bent lever R, one arm of which carries the friction-roller S, and is lifted by the cam *i*, revolving under the roller at the cam's inclined plane *k*, and at the same time the other arm, T, of said lever lifts the dog V, pivoted at *l*, up behind the door-bolts W W W W into the position shown in Fig. 5, thereby locking the bolts forward behind the jamb of the safe, so that the door cannot be opened. In due time, when the cam *i* is rotated entirely from under the roller S, the latter will drop into the depression *h* at the inclined plane *m*, which allows the dog V to fall from behind the safe-bolts, when they may be retracted and the safe opened.

It will be noted that the dog always tends to turn on its pivot automatically by gravity, so as to present a free space for the retraction of the bolt-work, and it is held up only for predetermined periods, to be measured by the time mechanism by the bent lever.

The seventh-day wheel A has on its periphery a cam-projection, *n*, which rotates once while the depression *h* rotates seven times, as described, and it is so arranged relatively to the depression *h* that on every seventh revolution thereof it is brought under the roller S, and holds up the lever R while the depression *h* passes under it, so that every seventh day this projection *n* prevents the safe from being unlocked.

From the foregoing description the mode of operation will be obvious. The time-movements should be set to true time by bringing the hour-mark on the dial C under the roller S, which is readily done by turning the dial, as the wheels A, B, C, and M turn freely in the direction of the arrow on wheel C, because the ratchets behind wheels H and I do not interfere with motion in that direction, but take up and, through the force of the time-movements, proceed with whatever advance of said wheels may be made. The lock should then be set to lock up at any given hour by loosening the thumb-screw Q and turning the inclined plane *k* of the wheel B to the mark of the required hour, and then fastening the wheels B and C together by setting the thumb-screw Q. The dial will then indicate the time of locking and unlocking, and the operation of the time-movements will cause the oscillation of the dog into position to obstruct the retraction of the bolt-work in a little time, or at whatever time may have been decided upon, and it will be held there until the time arrives for unlocking, when the continued operation of the time-movements will withdraw its support, and it will fall out of the way.

If it is desired to have the safe opened any given amount of time earlier than the set time—say nine o'clock—the wheel C must be turned, as described, until the time indicated under the roller shall be that amount fast of the true time, the closing-mark being altered, if desired, to suit the case. If it is desired to open later, the clocks must be stopped until they are slow of time as much as it is desired the lock shall open later than the set time, correcting the closing-mark, if desired.

If the wheels A, B, C, and M are turned, as described, until the cam part *n* of the wheel A shall be in position to come under the roller S and keep the lock from opening on Sunday, it will continue to do so on Sunday each week, if the time-movements run on unchanged. Thus the necessity for setting the mechanism on each Saturday, so that it shall keep the safe locked over Sunday, is obviated, which is a great convenience to bankers, and is, furthermore, a security against neglect to set the mechanism weekly, which might sometimes occur. In case it shall be desired that the lock shall not open for a holiday or other day, the said wheels may be rotated until the cam-projection *n* is in position to come under the roller S and hold up the lever R on such day.

The lock is affixed to the side F of the safe, as described, to avoid derangement or stoppage of the time-movements by concussion on the door; but it is obvious that it may be affixed to the door without modifying its construction, if desired, that being merely a change of location.

It is evident that the dog V and the lever R may be one and the same piece. The object

70. LOCKS,

Search Room

273 of making them in two parts is to save the weight of the part V which depends upon the pivot *l* from adding to the labor of the time-movements, and also to make the dog or obstruction entirely distinct from the time mechanism.

I am aware of the patent granted to Williams and Cummings, No. 17,245, and dated May 5, 1857, and do not claim anything shown therein, but intend to limit my claims to comprehend only the improvements I have made over the peculiar combinations shown in that patent, whereby I reduce the number, modify the construction, change the relative position and mode of operation of the parts, and simplify my mechanical organization, as will fully appear by comparison.

What I claim as my invention is—

1. The combination, substantially as above set forth, of the adjustable mechanism for continuously locking and unlocking daily the time-movements, and a device for preventing unlocking during a period greater than twenty-four hours.

2. In a time-lock, the combination, substantially as above set forth, of the time-movements and an adjustable device for determining the time of locking.

3. The combination, with the time-movements, of the wheels H I, the ratchets K L, and the common wheel M, arranged as described, for the purpose set forth.

4. In combination with the dial, the seventh-day cam-wheel A, adjustable as described, to prevent the falling of the bent lever R and dog V, either periodically or at required times, as described.

5. The combination, in a time-lock, of time mechanism, a revolving graduated dial actuated thereby, a bent lever oscillated by the revolution of the dial on an immovable pivot, and a dog or obstruction, also oscillated on an immovable pivot, the lever and dog being so arranged that when one arm of the lever is pushed aside at a predetermined time by the revolution of the dial the other arm withdraws its support from under and permits the dog to turn by gravity, thereby leaving a free space for the retraction of the bolt-work, substantially as described.

6. The combination of multiple sliding bolt-work, a dog or obstruction oscillated on an immovable pivot, and tending, by gravity, to turn so as not to dog the bolt-work, a bent lever, oscillated also on an immovable pivot, for holding the dog in position against gravity to dog the bolt-work, a revolving graduated dial, which, by its revolution at a predetermined time, oscillates the bent lever and time mechanism that actuates the dial, substantially as described.

In testimony that I claim the foregoing I have hereunto set my hand this 12th day of December, 1877.

SAMUEL A. LITTLE.

Witnesses:

P. R. WOODWARD,

CHAS. ELMER.